US009614466B2

(12) United States Patent
Usselman et al.

(10) Patent No.: US 9,614,466 B2
(45) Date of Patent: Apr. 4, 2017

(54) ELECTRONIC BRAKING FOR A UNIVERSAL MOTOR IN A POWER TOOL

(71) Applicant: Black & Decker Inc., Newark, DE (US)

(72) Inventors: Robert A. Usselman, Forest Hill, MD (US); Anatoliy Nosov, Parkville, MD (US)

(73) Assignee: Black & Decker Inc., New Britain, CT (US)

( * ) Notice: Subject to any disclaimer, the term of this patent is extended or adjusted under 35 U.S.C. 154(b) by 15 days.

(21) Appl. No.: 14/717,010

(22) Filed: May 20, 2015

(65) Prior Publication Data

US 2015/0340974 A1    Nov. 26, 2015

Related U.S. Application Data

(60) Provisional application No. 62/000,758, filed on May 20, 2014.

(51) Int. Cl.
*H02P 25/14* (2006.01)
*H02P 3/22* (2006.01)
(Continued)

(52) U.S. Cl.
CPC .................. *H02P 3/22* (2013.01); *H02P 3/18* (2013.01); *H02P 25/14* (2013.01); *H02P 7/293* (2016.02)

(58) Field of Classification Search
CPC .................................. H02P 3/22; H02P 25/14
(Continued)

(56) References Cited

U.S. PATENT DOCUMENTS 3,548,276 A   12/1970   Gross
3,673,481 A    6/1972   Hardin
(Continued)

FOREIGN PATENT DOCUMENTS

DE    3539841 A1    3/1987
DE    4200996 A1    7/1993
(Continued)

OTHER PUBLICATIONS

European Search Report dated Apr. 29, 2016.

*Primary Examiner* — Bentsu Ro
(74) *Attorney, Agent, or Firm* — Amir R. Rohani

(57) ABSTRACT

A power system is provided comprising an electric universal motor including an armature rotatable coupled to an armature shaft and a commutator disposed on an armature shaft, a pair of brushes engaging the commutator, and a field having at least two field windings electrically coupled in series with the pair of brushes. The power system includes a power line having two terminals arranged to provide alternating-current (AC) power from a power supply, and a power switch provided in series with the field windings on a power line to provide AC power from the terminals to the motor when the power switch is closed. An electronic brake module is provided in the power system and configured to generate a braking force to stop the motor when the switch is opened, the electronic brake module comprising: a solid-state semiconductor switch arranged across the motor armature and the pair of brushes, a first diode arranged between a first node of the power line and the semiconductor switch, and a second diode arranged between a second node of the power line and the semiconductor switch, wherein the first node is arranged between one of the terminals and the power switch, and the second node is arranged between the power switch and the armature. A controller is provided in the
(Continued)

power system and configured to initiate a braking mode of operation to close the semiconductor switch when the power switch is opened.

28 Claims, 14 Drawing Sheets

(51) Int. Cl.
*H02P 3/18* (2006.01)
*H02P 7/293* (2016.01)

(58) Field of Classification Search
USPC .............. 318/375, 379, 380, 381, 244, 245; 388/825
See application file for complete search history.

(56) References Cited

U.S. PATENT DOCUMENTS

| | | | |
|---|---|---|---|
| 3,708,734 A | 1/1973 | Rowe | |
| 3,742,507 A | 6/1973 | Pirre | |
| 3,815,002 A | 6/1974 | Clemente et al. | |
| 3,848,169 A | 11/1974 | Asano et al. | |
| 3,895,277 A | 7/1975 | Klumpp | |
| 3,897,595 A | 7/1975 | Fearno | |
| 3,965,404 A | 6/1976 | Petersen | |
| 4,088,933 A | 5/1978 | Hashimoto et al. | |
| 4,161,921 A | 7/1979 | Nishida et al. | |
| 4,176,306 A | 11/1979 | Asano et al. | |
| 4,216,417 A | 8/1980 | Anderson et al. | |
| 4,228,383 A | 10/1980 | Soeda et al. | |
| 4,243,919 A * | 1/1981 | Brown | H02P 3/12 318/250 |
| 4,249,117 A | 2/1981 | Leukhardt et al. | |
| 4,250,436 A | 2/1981 | Weissman | |
| 4,284,936 A | 8/1981 | Bailey et al. | |
| 4,311,948 A | 1/1982 | Brown et al. | |
| 4,431,956 A | 2/1984 | Angquist | |
| 4,450,397 A | 5/1984 | Painter et al. | |
| 4,498,033 A | 2/1985 | Aihara et al. | |
| 4,644,201 A | 2/1987 | Tani et al. | |
| 4,718,013 A | 1/1988 | Kubo | |
| 4,725,764 A | 2/1988 | Prestel | |
| 4,751,414 A | 6/1988 | Davis et al. | |
| 4,916,370 A | 4/1990 | Rowan et al. | |
| 4,937,509 A | 6/1990 | Gundlach | |
| 4,978,897 A | 12/1990 | Merrison et al. | |
| 5,063,319 A | 11/1991 | Mason et al. | |
| 5,180,023 A | 1/1993 | Reimers | |
| 5,294,874 A * | 3/1994 | Hessenberger | H02P 3/06 318/245 |
| 5,424,622 A | 6/1995 | Keller et al. | |
| 5,485,064 A | 1/1996 | Arnaud et al. | |
| 5,485,066 A | 1/1996 | Zeigler | |
| 5,517,093 A | 5/1996 | Augustyniak et al. | |
| 5,552,686 A | 9/1996 | Schmid et al. | |
| 5,572,916 A | 11/1996 | Takano | |
| 5,644,112 A | 7/1997 | Geiger et al. | |
| 5,644,202 A | 7/1997 | Toriyama et al. | |
| 5,708,333 A | 1/1998 | Kirn | |
| 5,760,553 A | 6/1998 | Astic et al. | |
| 5,764,009 A | 6/1998 | Fukaya et al. | |
| 5,789,885 A | 8/1998 | Seel | |
| 5,828,194 A | 10/1998 | Canova | |
| 5,861,724 A | 1/1999 | Ackerson | |
| 6,013,993 A * | 1/2000 | Barbisch | H02P 3/06 318/245 |
| 6,037,729 A | 3/2000 | Woods et al. | |
| 6,045,076 A | 4/2000 | Daniels | |
| 6,051,952 A | 4/2000 | Moreira et al. | |
| 6,094,025 A | 7/2000 | Rosa | |
| 6,104,155 A | 8/2000 | Rosa | |
| 6,208,096 B1 | 3/2001 | Mahr et al. | |
| 6,236,177 B1 * | 5/2001 | Zick | B23D 59/001 318/362 |
| 6,353,297 B1 | 3/2002 | Meyer | |
| 6,448,727 B1 | 9/2002 | Rotterhusen | |
| 6,573,681 B2 | 6/2003 | Schwesig | |
| 6,943,510 B2 | 9/2005 | Gorti | |
| 6,998,804 B2 | 2/2006 | Meyer et al. | |
| 7,071,645 B2 | 7/2006 | Hahn et al. | |
| 7,270,591 B2 | 9/2007 | Deshpande et al. | |
| 7,498,762 B2 | 3/2009 | Takada | |
| 8,350,512 B2 | 1/2013 | Matsunaga et al. | |
| 2009/0102404 A1 | 4/2009 | Burema et al. | |
| 2010/0148611 A1 | 6/2010 | Wang et al. | |
| 2011/0284256 A1 | 11/2011 | Iwata | |
| 2012/0091932 A1 | 4/2012 | Rottmerhusen | |

FOREIGN PATENT DOCUMENTS

| | | |
|---|---|---|
| DE | 4201005 C2 | 8/1995 |
| DE | 4429962 A1 | 2/1996 |
| DE | 19542603 C2 | 5/1996 |
| DE | 19651298 C2 | 6/1998 |
| DE | 4244805 C2 | 9/1999 |
| DE | 19809939 A1 | 9/1999 |
| DE | 10317636 A1 | 11/2004 |
| DE | 102009031224 B3 | 9/2010 |
| DE | 102011110929 A1 | 1/2011 |
| DE | 102009060731 A1 | 6/2011 |
| EP | 0578366 A2 | 12/1973 |
| EP | 0740407 B1 | 5/1985 |
| EP | 0594115 B1 | 4/1994 |
| EP | 0601352 A1 | 6/1994 |
| EP | 0639304 B1 | 2/1995 |
| EP | 0721693 B1 | 7/1996 |
| EP | 0761398 B1 | 3/1997 |
| EP | 0867065 B1 | 9/1998 |
| EP | 0924848 B1 | 6/1999 |
| EP | 1154554 A1 | 11/2001 |
| EP | 1145421 B1 | 7/2002 |
| EP | 1385261 A2 | 1/2004 |
| EP | 1580877 A2 | 9/2005 |
| EP | 1014543 B1 | 10/2006 |
| EP | 2404375 B1 | 1/2012 |
| EP | 2509212 A2 | 10/2012 |
| EP | 2517349 A2 | 10/2012 |
| GB | 1339352 A | 12/1973 |
| GB | 2046642 A | 11/1980 |
| GB | 2052170 A | 1/1981 |
| JP | 55049903 A | 4/1980 |
| JP | S55058786 A | 5/1980 |
| JP | S5612881 A | 2/1981 |
| JP | S5725182 A | 2/1982 |
| JP | H01308200 A | 12/1989 |
| JP | 0421377 A | 1/1992 |
| JP | H0473075 A2 | 3/1992 |
| JP | 5-305554 A | 11/1993 |
| JP | H0586413 U | 11/1993 |
| JP | H07184392 A | 7/1995 |
| JP | 2000209885 A | 7/2007 |
| WO | 8803337 A1 | 5/1988 |
| WO | 9103866 A1 | 3/1991 |
| WO | 2006057548 A1 | 6/2006 |
| WO | 2010099787 A2 | 9/2010 |
| WO | 2013149780 A2 | 10/2013 |
| WO | 2013152900 A2 | 10/2013 |

\* cited by examiner

ELECTRONIC BRAKING FOR A UNIVERSAL MOTOR IN A POWER TOOL

CROSS-REFERENCE TO RELATED APPLICATION

This application claims the benefit of U.S. Provisional Patent Application 62/000,758 filed May 20, 2014, which is incorporated herein by reference in its entirety.

FIELD OF THE INVENTION

The present invention relates to an electric motor in a power system and particularly to electronic braking of a universal electric motor in a power tool.

BACKGROUND

Alternating Current (AC) universal electric motors are used in a wide variety of applications involving power tools such as drills, saws, sanding and grinding devices, yard tools such as edgers and trimmers, just to name a few. These devices all make use of electric motors having an armature and a field, such as a stator. The armature is typically formed from a lamination stack or core around which a plurality of windings of magnet wires are wound. The lamination stack is formed to have a plurality of poles around which the magnet wires are wound. In this regard, the lamination stack may be formed with a plurality of slots in which the magnet wires are wound. The magnet wires are coupled at their ends to a commutator, such as to tangs when the commutator is a tang type commutator, disposed on an armature shaft extending coaxially through the lamination stack. The commutator is in contact with one or more brushes, which energize the magnet wires to cause rotation of the armature inside the stator.

In conventional power tools, when the user stops operating the tool by, for example, releasing the tool trigger switch or turning off the power switch, the electric motor is disconnected from the power source and allowed to coast down. Coasting often takes a long time and is undesirable to the user.

As an alternative method to coasting, braking mechanisms have been offers to bring the motor into a halt. One such mechanism is a mechanical brake, which engages the motor shaft and/or tool transmission to stop the rotation of the motor. Alternatively, electronic braking mechanisms may be employed to brake the motor in a controlled fashion. Electronic brake modules often include switching mechanism to short the armature windings and use the current generated by the back electromotive force (EMF) of the motor armature to slow down the armature. This may be done by running current through dedicated brake windings provided in the proximity of the armature windings in the opposite direction of the back EMF current. Alternatively, current from the AC mains may be directed to one or more of the motor field windings in the opposite direction of the back EMF current to slow down the armature.

Conventional electronic brake modules typically utilize multiple mechanical switch or relays for braking. Such circuits tend to be complex and costly. What is needed is a braking circuit arrangement that minimizes switch contacts in order to reduce cost and space.

SUMMARY

In an embodiment of the invention, a power system is provided comprising an electric universal motor including an armature rotatable coupled to an armature shaft and a commutator disposed on an armature shaft, a pair of brushes engaging the commutator, and a field having at least two field windings electrically coupled in series with the pair of brushes. The power system further comprises a power line having two terminals arranged to provide alternating-current (AC) power from a power supply, and a power switch provided in series with the field windings on a power line to provide AC power from the terminals to the motor when the power switch is closed. In an embodiment, the power system comprises: an electronic brake module configured to generate a braking force to stop the motor when the switch is opened, the electronic brake module comprising: a solid-state semiconductor switch arranged across the motor armature and the pair of brushes, a first diode arranged between a first node of the power line and the semiconductor switch, and a second diode arranged between a second node of the power line and the semiconductor switch, wherein the first node is arranged between one of the terminals and the power switch, and the second node is arranged between the power switch and the armature. In an embodiment, the power system comprises a controller configured to initiate a braking mode of operation to close the semiconductor switch when the power switch is opened.

In an embodiment, the controller is configured open the semiconductor switch when the power switch is closed to initiate a normal mode of operation.

In an embodiment, in the braking mode of operation, current from the AC power source flows via a first current path through the first diode, the semiconductor switch, and at least one of the field windings. In an embodiment, in the braking mode of operation, current associated with the motor armature voltage flows via a second current path through the second diode and the semiconductor switch.

In an embodiment, one of the field windings is arranged between the armature and the power switch such that, in the braking mode of operation, current from the AC power source flows through the other field winding. In an alternative embodiment, neither of the field windings is arranged between the armature and the power switch such that, in the braking mode of operation, current from the AC power source flow through both field windings.

In an embodiment, the controller configured to monitor voltage across the power switch to determine if the power switch is open or close.

In an embodiment, the power system further comprises a phase-controlled switch disposed in series with the field windings on the power line to control the supply of AC power from the terminals to the motor. In an embodiment, the controller is configured to control a phase of the phase-controlled switch according to a desired speed level of the motor in a normal mode of operation.

In an embodiment, the controller is configured to monitor voltage across the controllable switch to determine if the power switch is open or closed.

In an embodiment, the controller is configured to control a phase of the phase-controlled switch to optimize at least one of a baking time or braking torque associated with the motor in the braking mode of operation. In an embodiment, the controller is configured to control a phase of the phase-controlled switch to provide a conduction angle of forty degrees or lower. In an embodiment, the controller is configured to control the phase of the phase-controlled switch at a first conduction band within a first braking cycle and at a second conduction band different from the first conduction band within a second braking cycle.

In an embodiment, the controller is configured to introduce a delay period between the power switch being opened and the semiconductor switch getting closed.

In an embodiment, the electronic brake module comprises a gate driver configured to drive a gate of the semiconductor switch to close the semiconductor switch in the braking mode of operation based on a control signal from the controller.

In an embodiment, the power system is a power tool. In an embodiment, the power tool is a grinder.

DESCRIPTION

Figure 1:
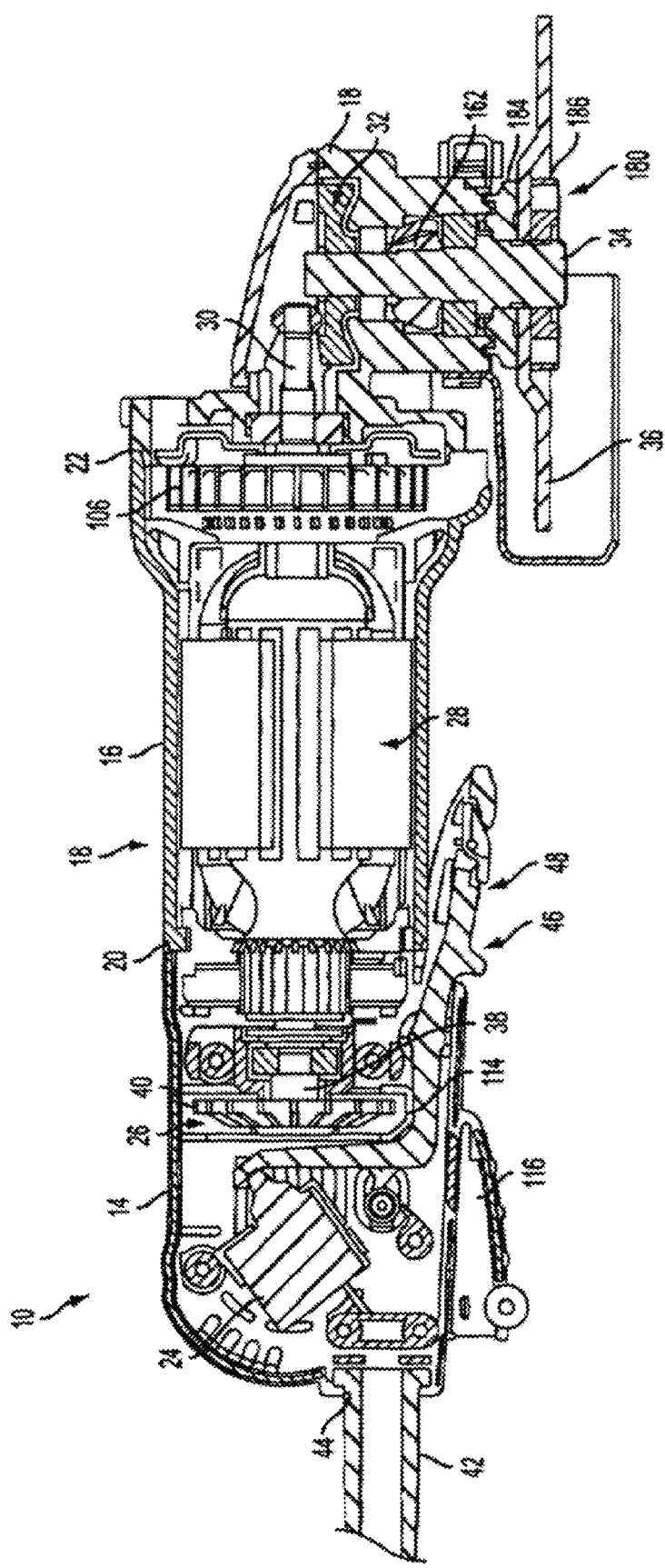
FIG. 1 depicts a side view of an exemplary power tool, in this case an angle grinder, with its housing partially removed, according to an embodiment.
Figure 2:
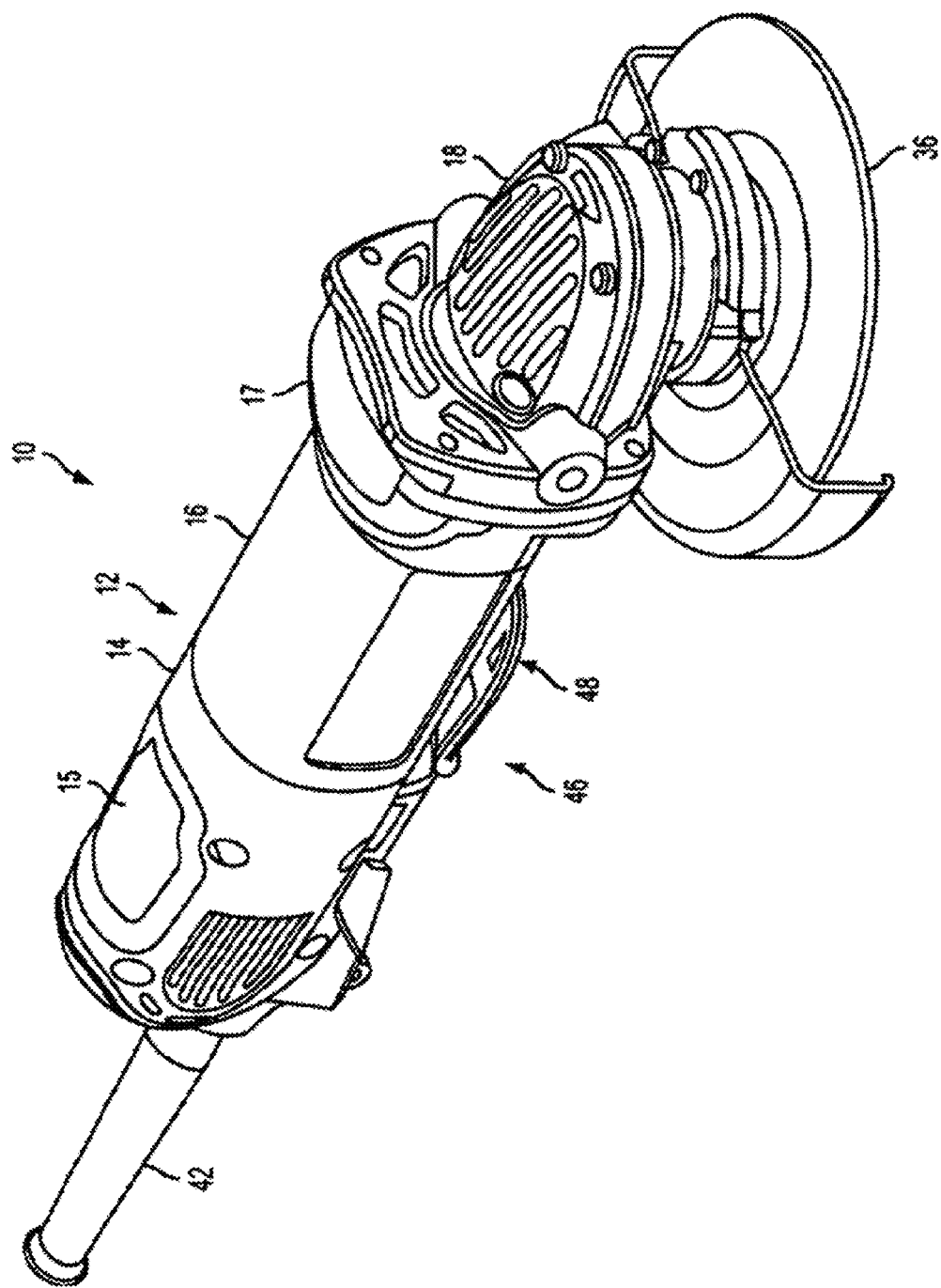
FIG. 2 depicts a perspective view of the angle grinder of FIG. 1, according to an embodiment.

With reference to FIGS. 1 and 2, an embodiment of an angle grinder 10 is shown. The embodiments of the present disclosure describe various features of an angle grinder and it will be readily appreciated that the described features may be applied to any angle grinder known in the art, including large angle grinders (LAG), medium angle grinders (MAG), and small angle grinders (angle grinder). It is noted that while angle grinder 10 is depicted as an example of a power tool in which aspects of the invention may be employed, the electronic Brake module and mechanism of the invention may be used in any power tool, including a drill, impact driver, hammer drill, hammer, chain saw, chop saw, circular saw, nailer, jig saw, concrete cutter, etc.

According to an embodiment, the angle grinder 10 preferably includes a housing 12 having a handle portion 14, a field case 16, and a gear case 18. The handle portion 14 is preferably fixedly attached to a first end 20 of the field case 16 and the gear case 18 is preferably fixedly attached to a second end 22 of the field case 16. The handle portion 14 preferably supports a switch 24 and associated components. The handle portion 14 also preferably supports a particle separation assembly 26. The field case 16 preferably supports a motor 28 having a motor spindle 30 that extends into the gear case 18 for driving gearset 32 supported therein. A wheel spindle 34 preferably extends from gear case 18 and is driven by the motor spindle 30 through the gearset 32. The axis of rotation of motor spindle 30 is generally perpendicular to the axis of rotation of the wheel spindle 34. A grinder wheel 36 is preferably selectively attachable to the wheel spindle 34 and is rotatably driven thereby. The motor 28 may also have a second spindle 38 that extends into the handle portion 14 for rotatably driving a fan 40, associated with the particle separation assembly 26.

In an embodiment, the motor 28 preferably is in electrical communication with the switch 24 through wires (not shown). Preferably, the switch 24 is further in electrical communication with a power source via a cord 42 including a plug (not shown). The handle portion 14 preferably includes an opening 44, opposite the connection end, through which the cord 42 runs. A trigger 46 preferably is in mechanical communication with the switch 24 for selectively supplying power to the motor 28. Mechanical actuation of the trigger 46 preferably results in actuation of the switch 24 thereby resulting in operation the angle grinder 10.

Figure 3:
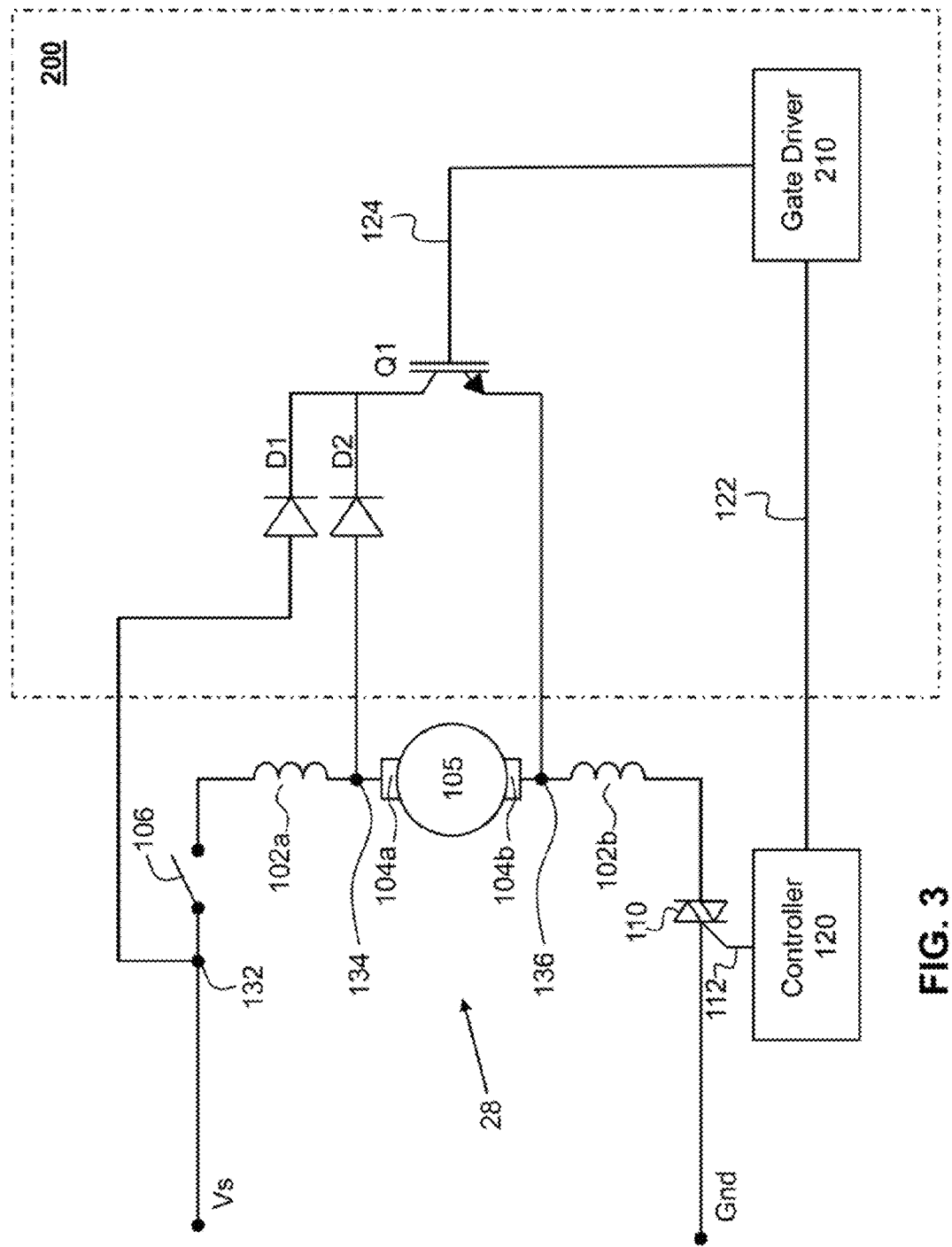
FIG. 3 depicts a block circuit diagram for a braking mechanism of a universal motor, according to an embodiment.

Referring to FIG. 3, a block circuit diagram for a braking mechanism of a universal motor in a power system, such as motor 28, is depicted, according to an embodiment of the invention.

In this embodiment, motor 28 is a universal series-wound brushed motor including two field windings 102a and 102b, brushes 104a and 104b, and an armature 105. Motor 28 is coupled to nodes GND and VS of an AC power source (not shown). In an embodiment, provided in series with field winding 102a on the AC power line is an ON/OFF power switch 106. Power switch 106 may be a mechanical switch coupled to an actuator that is turned on or off by the user. Alternatively, power switch 106 may be coupled to a variable-speed trigger switch, release of which opens the power switch 106. It is noted that power tool 10 of the present invention may be a variables-speed tool having a trigger switch, a speed dial, etc., or a constant-speed tool having an on/off switch. It is further noted that power switch 106 may be provided anywhere on the AC power line.

According to an embodiment, provided in series with field winding 102b is a phase-controlled power switch, in this case a triac 110, on the AC power line. Triac 110 is controlled by a controller 120. Controller 120 is a speed controller that generates a speed control signal based on, for example, a trigger on line 112 that determines the firing angle of the triac 110. The firing point of the triac 110 correlates to the conduction band of the AC power supplied to the motor 28. In this manner, the controller 120 controls the speed of the motor 28. It is noted that triac 110 may be provided anywhere on the AC power line in series with the field windings 102a, 102b. It is also noted that triac 110 herein is provided as an example of a phase-controlled switch and any other type of phase-controlled switch such as one or more thyristors, silicon-controlled rectifier (SCR) switch, etc. may be used in place of triac 110.

According to an embodiment, controller 120 may monitor the voltage across the power switch 106 to determine if power switch 106 is open or closed. Alternatively, controller 120 may monitor the voltage across triac 110 to determine if power switch 106 is open or closed. In the latter embodiment, since one node of the triac is couple to the GND terminal, some voltage develops across the triac 110 when power switch 106 is closed. Conversely, when power switch 106 is opened, no voltage is detected across the triac 110.

According to an embodiment, an electronic brake module 200 is provided to electronically brake the motor 28 when power switch 106 is opened, i.e., the tool is turned off by the user or variable speed trigger is released. Brake module 200 includes a semiconductor switch Q1 provided across the motor armature 105 and the brushes 104*a*, 104*b*. In an embodiment, Q1 may be any solid-state semiconductor power device. In an embodiment, switch Q1 may be a MOSFET, although in high power applications operating with high voltage power sources (e.g., 230V), an insulated-gate bipolar transistor (IGBT) may be used instead. A MOSFET provides some advantages over an IGBT, namely, high switching capabilities. An IGBT has better power handling capability. In this disclosure, references are made to a gate, a source, and a drain as nodes of switch Q1. Those skilled in the art will appreciate that source and drain commonly refer to nodes for a MOSFET, and emitter and collector are commonly used to refer to nodes of an IGBT. It should be understood that any reference to a source or drain of Q1 in this disclosure is exemplary and these terms respectively correspond and refer to an emitter and a collector where Q1 is an IGBT.

In an embodiment, brake module 200 is controlled and activated by controller 120. When controller 120 detects that power switch 106 has been opened, it initiates a brake control signal on line 122. Brake module 200 includes a gate driver module 210 that is activated by line 122. Gate driver module 210 in turn provides a voltage to the gate of Q1 sufficient to turn Q1 ON, as discussed below in detail.

In addition, in an embodiment, braking circuit 200 further includes two diodes D1 and D2. In an embodiment, cathodes of D1 and D2 are both coupled together with the source of Q1. In an embodiment, the anode of D1 is coupled to node 132, which is located between power switch 106 and Vs terminal. In an embodiment, the anode of D2 is coupled to node 134 located between field winding 102*a* and brush 104*a*. The source of Q1 is coupled to node 136 located between field winding 102*b* and brush 104*b*.

Figure 4:
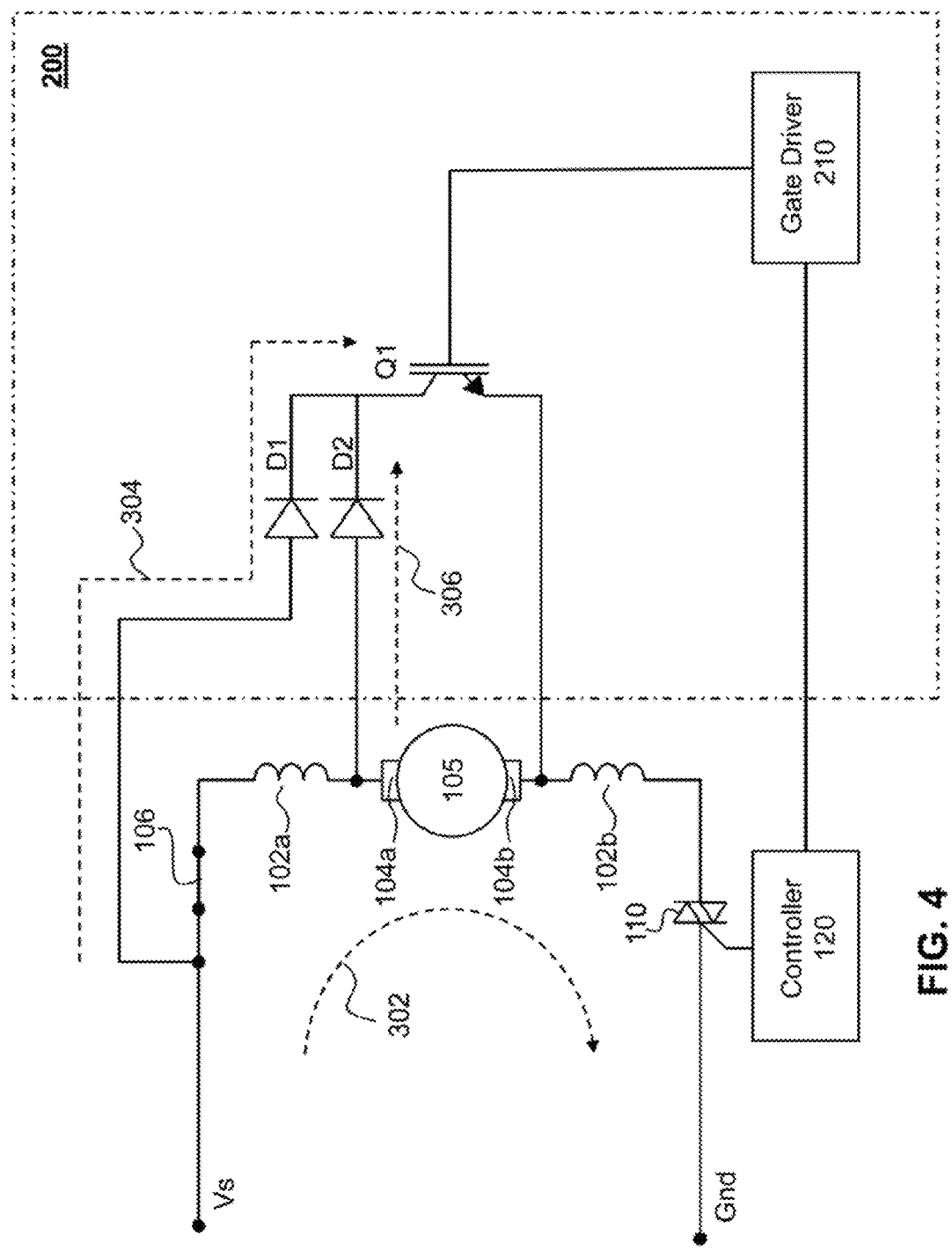
FIG. 4 depicts the circuit diagram of FIG. 3 during the normal mode of operation of the power tool, according to an embodiment.

FIG. 4 depicts the circuit diagram of FIG. 3 during the normal operation of the power tool, according to an embodiment. In this mode, power switch 106 is closed, and motor current follows current path 302 and flows through the motor winding 102*a*, the armature 105, motor winding 102*b*, and triac 110. The Controller 120 controls the firing angle of the triac 110, thereby regulating the conduction band of each AC half cycle flowing through the motor 32. Meanwhile, current flowing through D1 and D2 through current paths 304 and 306 are cut off at Q1, which is turned OFF during normal motor run mode.

Figure 5:
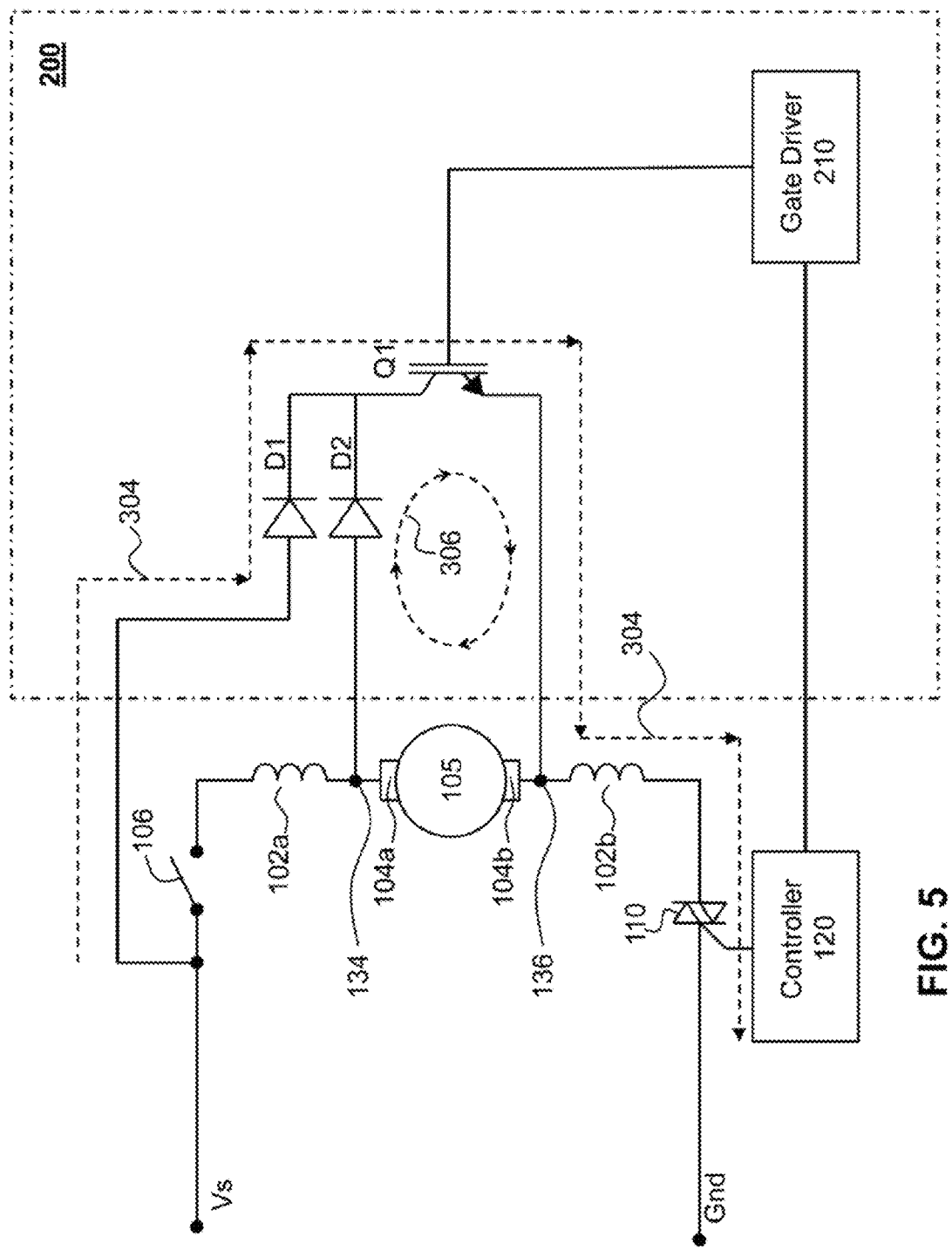
FIG. 5 depicts the circuit diagram of FIG. 3 during the braking mode of operation of the power tool, according to an embodiment.

FIG. 5 depicts the circuit diagram of FIG. 3 during motor brake mode, according to an embodiment. In this mode, power switch 106 is opened, and current no longer flows from the AC mains power line through field windings 102*a* and into the armature 105. Instead, current from the AC mains power line flows along current path 304, though D1, Q1 (which has been turned ON by the controller 120 and the gate driver 210), field winding 102*b*, and triac 110. Meanwhile, the continued rotation of the armature 105 inside the field winding 102*b* generates a back EMF voltage as a result of the relative motion of the armature and a magnetic field. This voltage is positive at node 134. After Q1 is turned ON, it shorts nodes 134 and 136, thus creating a current path along 306 though diode D1 and switch Q1. This current provides the braking torque for field winding 102*b* to brake the rotation of armature 105.

In this embodiment, the current through Q1 is the sum of the currents in current paths 304 and 306 through diodes D1 and D2. Specifically, contrary to some conventional designs where multiple power switches are utilizes to carry out electronic braking of the motor, the present design utilizes a single power switch Q1 to carry both the field current supplied by the AC mains power line and the armature current generated by the back EMF voltage of the armature.

According to an embodiment, during the braking mode of the motor, controller 120 optimizes the braking time and braking torque by controlling the AC current running through the triac 110. For example, in some applications it may be desirable to execute motor braking over a time span of 2-5 seconds to ensure that the motor doesn't come to a sudden halt, which may damage the tool or create a kickback for the user. Thus, controller 120, according to an embodiment, is configured to fire the traic 110 at, for example, 140 to 160 degree firing angles (i.e., 20 to 40 conduction angles) to provide a smooth braking operation.

Two aspects and advantages of this embodiment are discussed herein.

First, when a single field winding 102*b* is utilized during the braking cycle as described above, controller 120 can execute braking over a longer conduction angle of the AC waveform. Specifically, when utilizing both field windings 102*a* and 102*b* during braking, the controller has to fire the triac 110 within narrow conduction angles in order to extend the total braking period. By way of example, when using a single field winding 102*b* as show in the illustrative figures, the controller 120 controls the triac 110 to conduct at 20 to 40 degree conduction angles in order to executing motor braking in 2 to 5 seconds. By comparison, in a circuit arrangement where both field windings 102*a* and 102*b* are used to brake the motor, as described later in this disclosure, the controller has to control the triac 110 to conduct at, for example, approximately 10-20 conduction angles to accomplish the same braking time. Although the latter arrangement may be advantageous in some embodiments, as discussed later, the former arrangement provides a greater conduction angle for the triac 110 to be fired, thus make it easier to obtain an accurate amount of conduction current.

Second, according to an embodiment, controller 120 may be configured to dynamically modify the firing angle of the triac 110 to execute a steady and smooth braking operation. Specifically, when braking mode is first initiated, armature rotational speed is relatively high, which causes higher amount of armature current through current path 306 and diode D2. As the armature slows down, armature current through current path 306 gradually decreases. In order to maintain a steady amount of total current through the power switch Q1, and moreover to create a smooth braking operation, according to an embodiment, the controller 120 is configured to incrementally increase the conduction angle of the AC power line via the triac 110. In an embodiment, the controller 120 is configured to break the total brake period into segments and incrementally increase the conduction angle from one segment to the next. In an exemplary embodiment, where the total desired braking time is 3 seconds, the controller 120 may modify the conduction band from 15 degrees within the 1st second, to 20 degrees within the 2nd second, and 25 degrees within the 3rd second.

Figure 6:
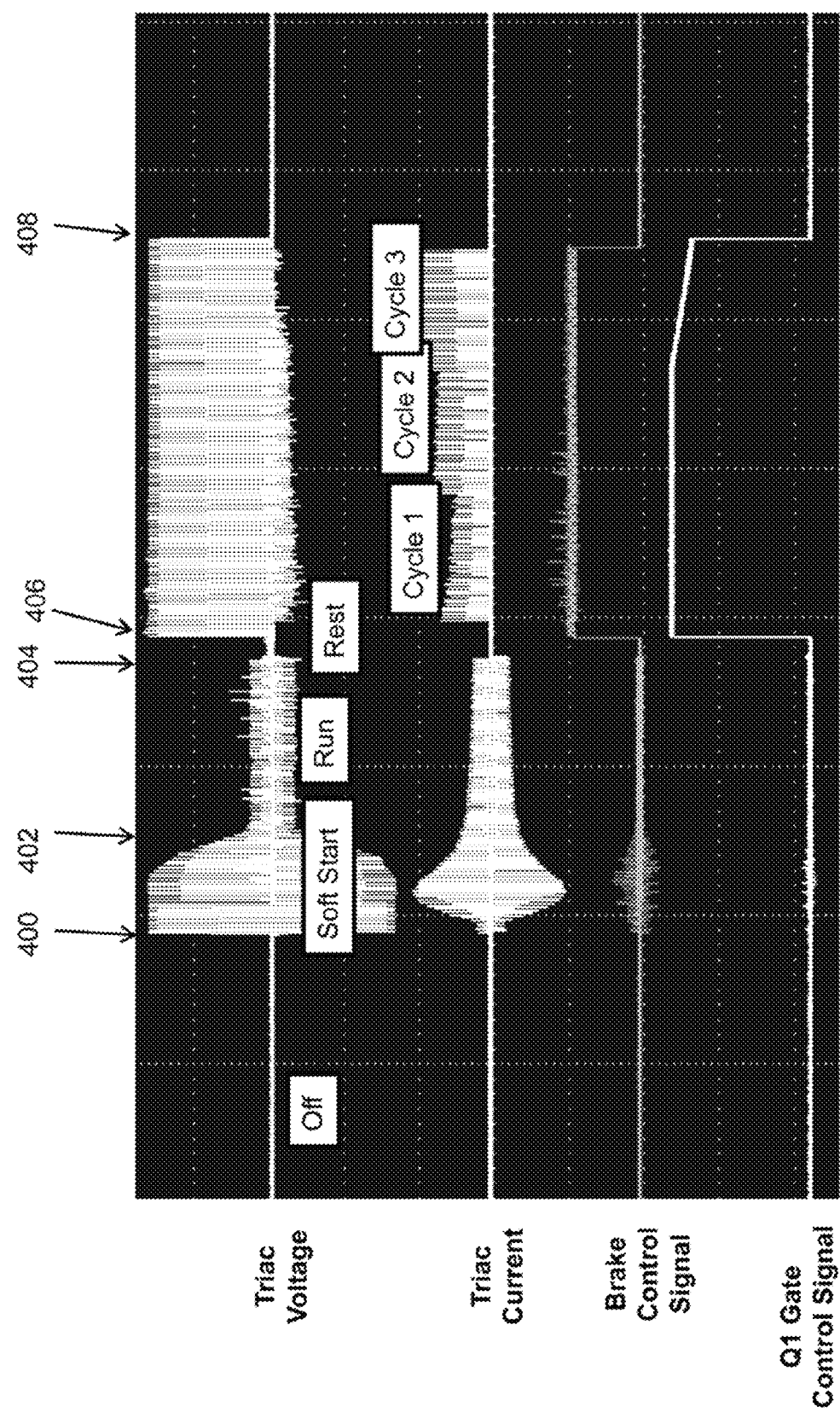
FIG. 6 depicts a waveform diagram of the various voltage and current measurements in the circuit of FIGS. 3-5, according to an embodiment.

FIG. 6 depicts a waveform diagram of the various voltage and current measurements in the circuit of FIGS. 3-5, according to an embodiment of the invention. As shown herein, when the power tool 10 is off and the power switch 106 is open, there is no current or voltage across the triac 110. In an embodiment, once the power switch is closed at 400, controller 120 initially controls the triac 110 to conduct at a low conduction angle in order to provide a tool soft-start. Soft-start decreases the motor in-rush current that results from the lack of rotational momentum in the armature 105 during this time. After soft-start, the tool operates normally at 402 until the power switch 106 is opened again at 404. In an embodiment, the controller 120 introduces a delay period between 404, which is when the controller 120 senses the opening of the power switch 106, and 406, when the controller 120 initiates braking. This delay period may be, for example, 100 ms, and is introduced to ensure that the current through the triac 110 is dropped to zero before braking is initiated. Furthermore, in an embodiment where Q1 is an IGBT, this delay period may be utilized to turn the gate of the IGBT ON. Depending on Q1 timing requirements, the brake control signal at line 122 may be activated by the controller 120 during or at the end of the delay period.

In an embodiment, braking of the motor is initiated at 406 when or after the brake control signal is activated by the controller 120. Q1 gate control signal is also activated by the gate driver 210 on line 124. Controller 120 controls and optimizes braking between 406 and 408, when the braking is terminated. In one embodiment, the controller 120 may monitor the motor speed and determine when to terminate braking dynamically once the motor speed reaches zero. In another embodiment, the total braking period between 406 and 408 may be configured to be long enough, for example, 2-5 seconds, to ensure motor stoppage regardless of motor speed at the start of braking.

According to an embodiment, as discussed above, the controller 120 may optimize and control the triac 110 during the braking period between 406 and 408 to limit the current through the field winding 102b in order to compensate for the high armature current through the armature 105 in the beginning of the braking period. In the shown embodiment, the controller breaks down the braking period into three segments or cycles, and fires the triac at a different conduction angle during each cycle. In an exemplary embodiment, the controller fires the triac at 15-30 degree conduction during the first cycle, 20-35 degree conduction during the second cycle, and 25-40 degree conduction during the third cycle.

Figure 7:
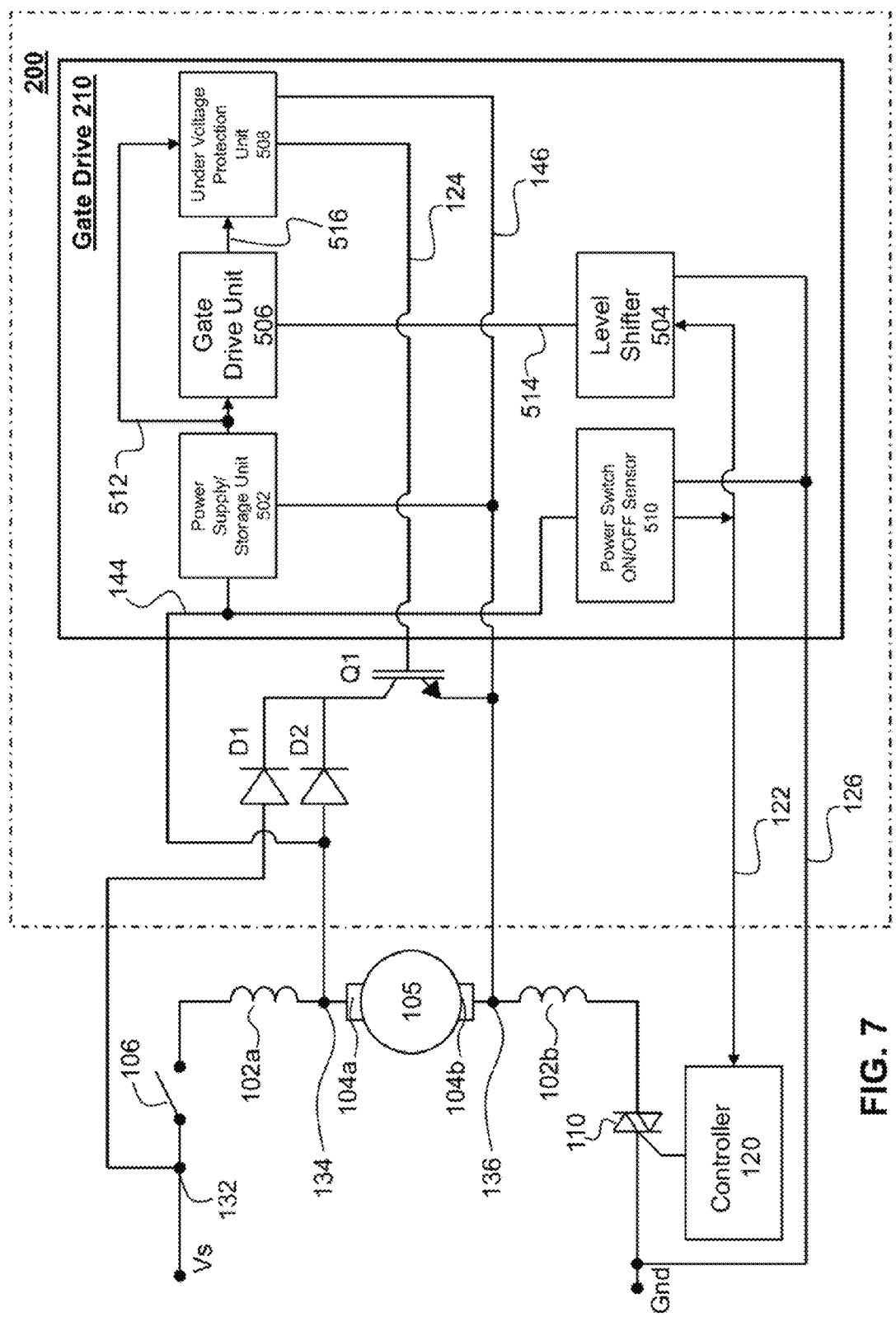
FIG. 7 depicts more complete circuit diagram of FIG. 3 including a block diagram of a gate driver, according to an embodiment.

Turning now to FIG. 7, a more complete circuit diagram of FIG. 3 is depicted, including a block diagram of the gate driver 210, and connections to the gate driver 210 from nodes 132, 134 and 136 of the power tool, according to an embodiment. In an embodiment, gate driver 210 includes a power supply and storage unit 502, a level shifter 504, a gate drive unit 506, an under-voltage protection unit 508, and a power switch ON/OFF sensor 510.

In an embodiment, the power supply and storage 502 is coupled to nodes 134 and 136 of the motor 28 (via lines 144 and 146 respectively), which allow its storage unit (discussed below) to be charged by the voltage across the armature 105. In an embodiment, the power supply and storage 502 is coupled to the gate drive unit 506 (via line 512), which includes the switching mechanism to provide power from the storage unit in the power supply and storage 502 to the gate of Q1.

In an embodiment, the gate drive unit 506 is controlled by level shifter 504 (via line 514), which is in turn coupled to the brake control signal 122 from the controller 120. In an embodiment, the level shifter 504 enables the gate drive unit 506 to supply power to the gate of Q1 when the brake control signal is activated by the controller 120.

In an embodiment, the under-voltage protection unit 508 is coupled to the gate drive unit 506 and the power supply and storage 502. In an embodiment, the under-voltage protection unit 508 monitors the storage unit in the power supply and storage 502 to ensure that it stores sufficient voltage to drive Q1. If the voltage of the storage unit is below a certain threshold, the under-voltage protection unit 508 disables the output of the gate drive unit 506.

In an embodiment, the power switch ON/OFF sensor 510 detects the state of the power switch 106 and overrides the brake control signal on line 122 if the power switch 106 is closed.

Figure 8:
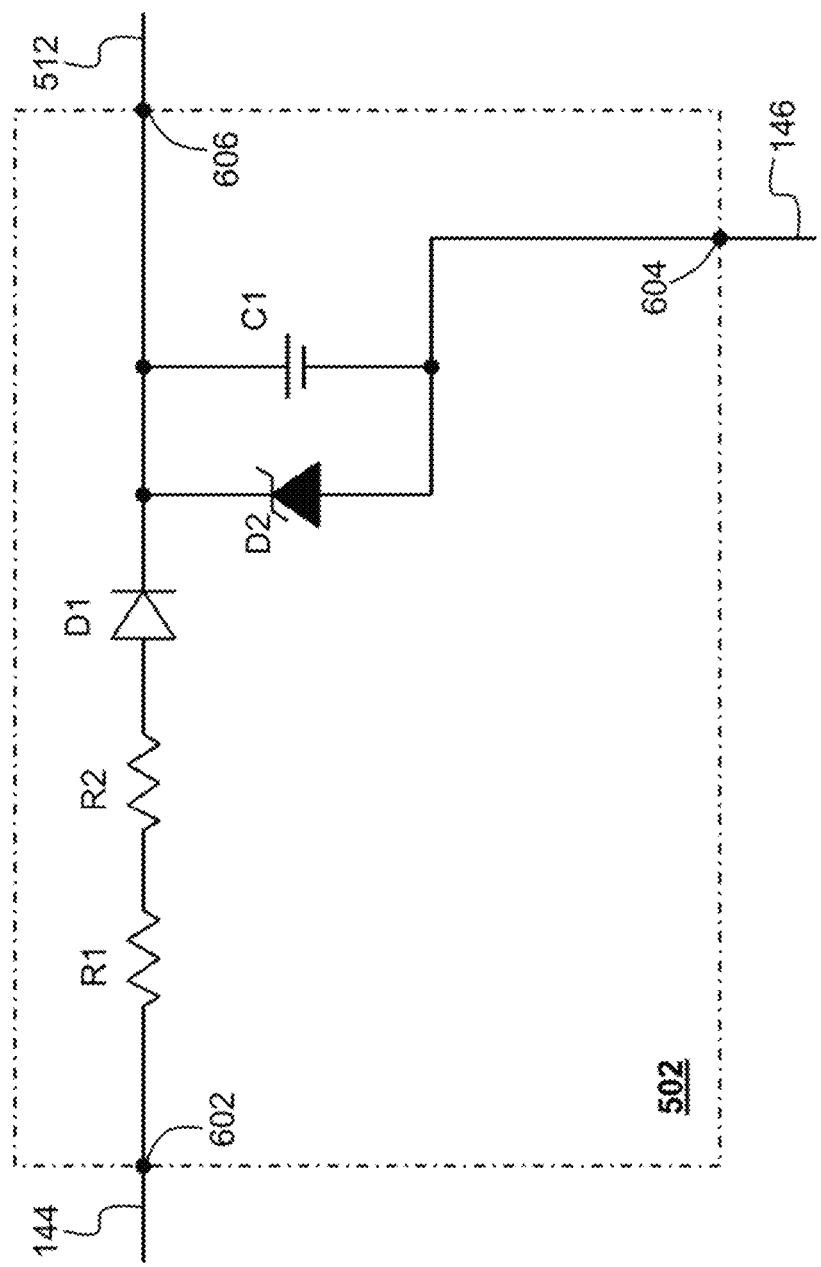
FIG. 8 depicts a circuit diagram of a power supply and storage unit, according to an embodiment.

FIG. 8 depicts a circuit diagram of the power supply and storage unit 502, according to an embodiment. The power supply and storage unit 502 is provided to supply sufficient power to drive the gate of Q1 throughout the braking period. In an embodiment, the power supply and storage unit 502 should be configured to maintain power supply to Q1 for 3 seconds or more, preferably 4 second or more, even more preferably 5 second or more.

According to an embodiment, as shown in this figure, with continued reference to FIG. 7, power supply and storage unit 502 includes a power terminal 602 coupled to one end of the armature 105 at node 134 via line 144 and a ground terminal 604 coupled to another end of the armature 105 at node 136 via line 146. In an embodiment, the power supply and storage unit 502 includes an R-C circuit including a capacitor C1 that is coupled to terminals 602 and 604 and is charged by the voltage developed across the armature 105 during the normal run time of the power tool. In an embodiment, the R-C circuit further includes resistors R1 and R2 in series with a diode D1 to direct flow of charging current to the capacitor C1, and a zener diode D2 that sets the power supply voltage to the capacitor C1 at a maximum threshold, e.g., 33V. In an embodiment, the power supply and storage unit 502 includes an output terminal 606 that couples the capacitor C1 to line 512 to supply power from the capacitor C1 to the gate drive unit 506 during the braking period.

Figure 9:
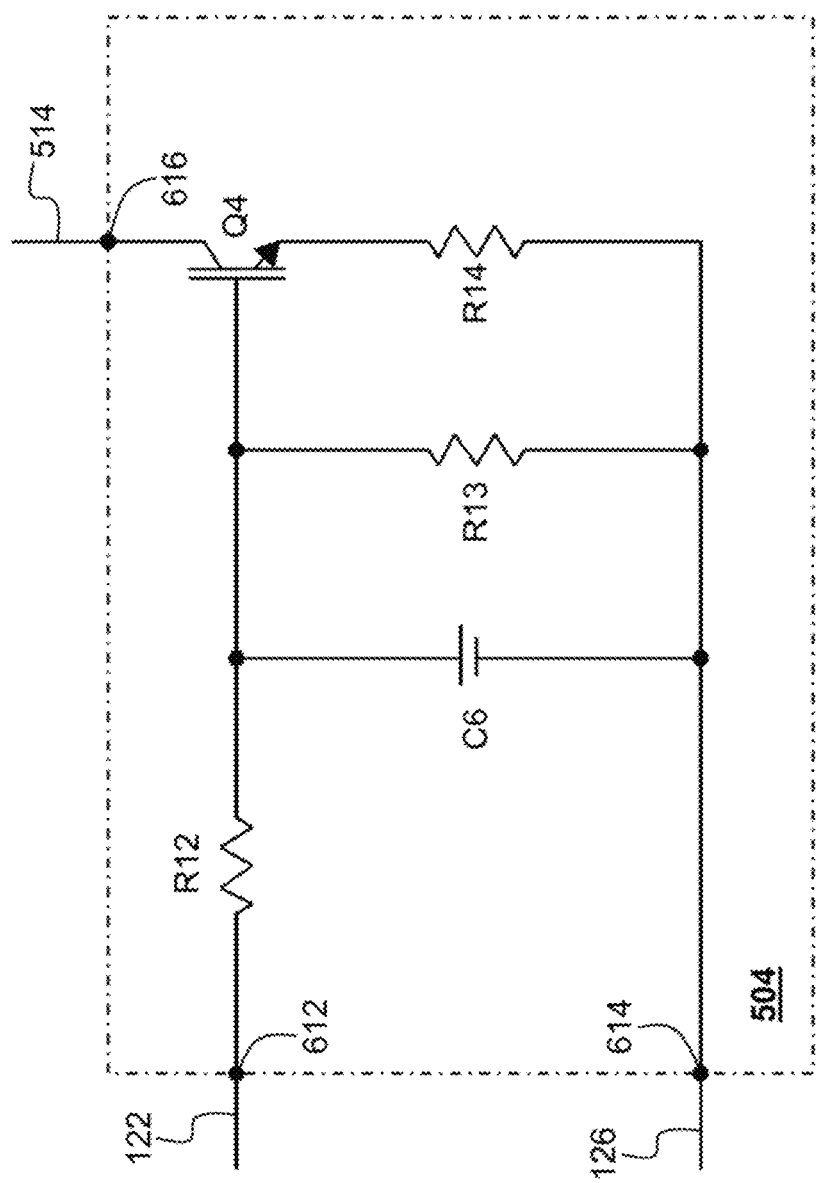
FIG. 9 depicts a circuit diagram of a level shifter, according to an embodiment.

FIG. 9 depicts a circuit diagram of the level shifter 504, according to an embodiment. Level shifter 504 is arranged to transfer the logic control brake signal 122 from the controller 120 to a high-voltage signal provided by the capacitor C1 sufficient to enable or disable the gate drive unit 506. In other words, the level shifter 504 enables the gate drive unit 506 to supply power to the gate of Q1 when the brake control signal is activated by the controller 120.

According to an embodiment, as shown in this figure, with continued reference to FIG. 7, level shifter 504 includes a brake terminal 612 coupled to the control brake signal 122 from the controller 120. This signal is coupled to a gate of a switch, such as a FET or BJT transistor, Q4. Switch Q4 is arranged between ground terminal 614 and output terminal 616, which are respectively coupled to lines 126 (Gnd) and 514 (coupled to the gate drive unit 506). In an embodiment, when the controller 120 activates the brake control signal on line 122, switch Q4 grounds line 514, which as discussed below, enables the gate drive unit 506.

Figure 10:
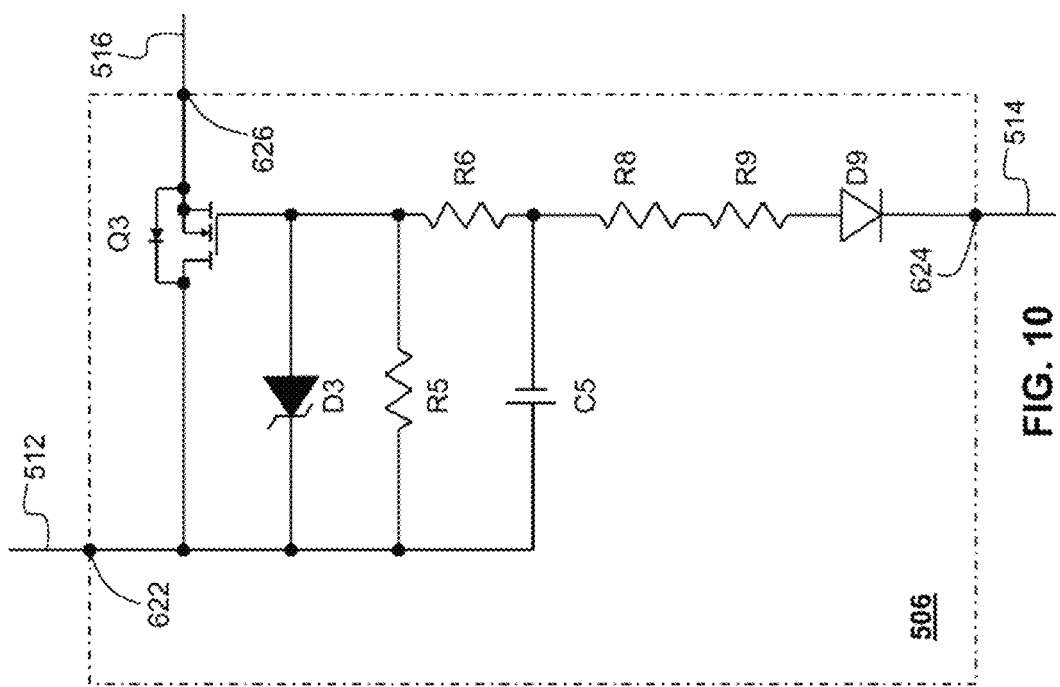
FIG. 10 depicts a circuit diagram of a gate drive unit, according to an embodiment.

FIG. 10 depicts a circuit diagram of the gate drive unit 506, according to an embodiment. The gate drive unit 506 is arranged as a switching mechanism between the power supply and storage unit 502 and the gate of Q1. The switching operation of the gate drive unit 506 is controlled by the output 514 of the level shifter 504.

According to an embodiment, as shown in this figure, with continued reference to FIG. 7, gate drive unit 506 includes a power terminal 622, which is coupled to capacitor C1 of the power supply and storage unit 502, and a control terminal 624, which is coupled to line 514 from the level shifter 504 discussed above. When line 514 is grounded by the level shifter 504 in response to activation of the control brake single 122, it creates a voltage difference between terminals 622 and 624, causing current to flow through resistor R5 (controlled by zener diode D3, resistors R6, R8, R9, and diode D9. This current path pulls the voltage at the gate of switch Q3 to Gnd. Q3, in this embodiment, is a p-channel MOSFET (PMOS), which is activated by a negative voltage at its gate. Thus, in an embodiment, when line 514 is grounded by the level shifter 504 in response to activation of the brake control single 122, it connects line 512 from the capacitor C1 to its output terminal 626, which is connected to a brake drive signal at line 516. In an embodiment, line 516 is coupled to the under-voltage protection unit 508.

The level shifter 504 and gate drive unit 506 discussed herein utilize a switching arrangement to cut off power from the capacitor C1 when the control brake signal is at a logic level '1'. It is noted that a variety of other circuits may be used to accomplish the same task. For example, in an embodiment, the level shifter 504 and gate drive unit 506 may be combined into a single unit including an optical-isolator (also referred to as a photo-coupler) including a light emitting diode that turns on when the brake control signal on line 122 is a logic '1' and a photo-transistor arranged between the capacitor C1 and the gate of Q1 to cut off power from the capacitor C1 when the light emitting diode is turned off.

Figure 11:
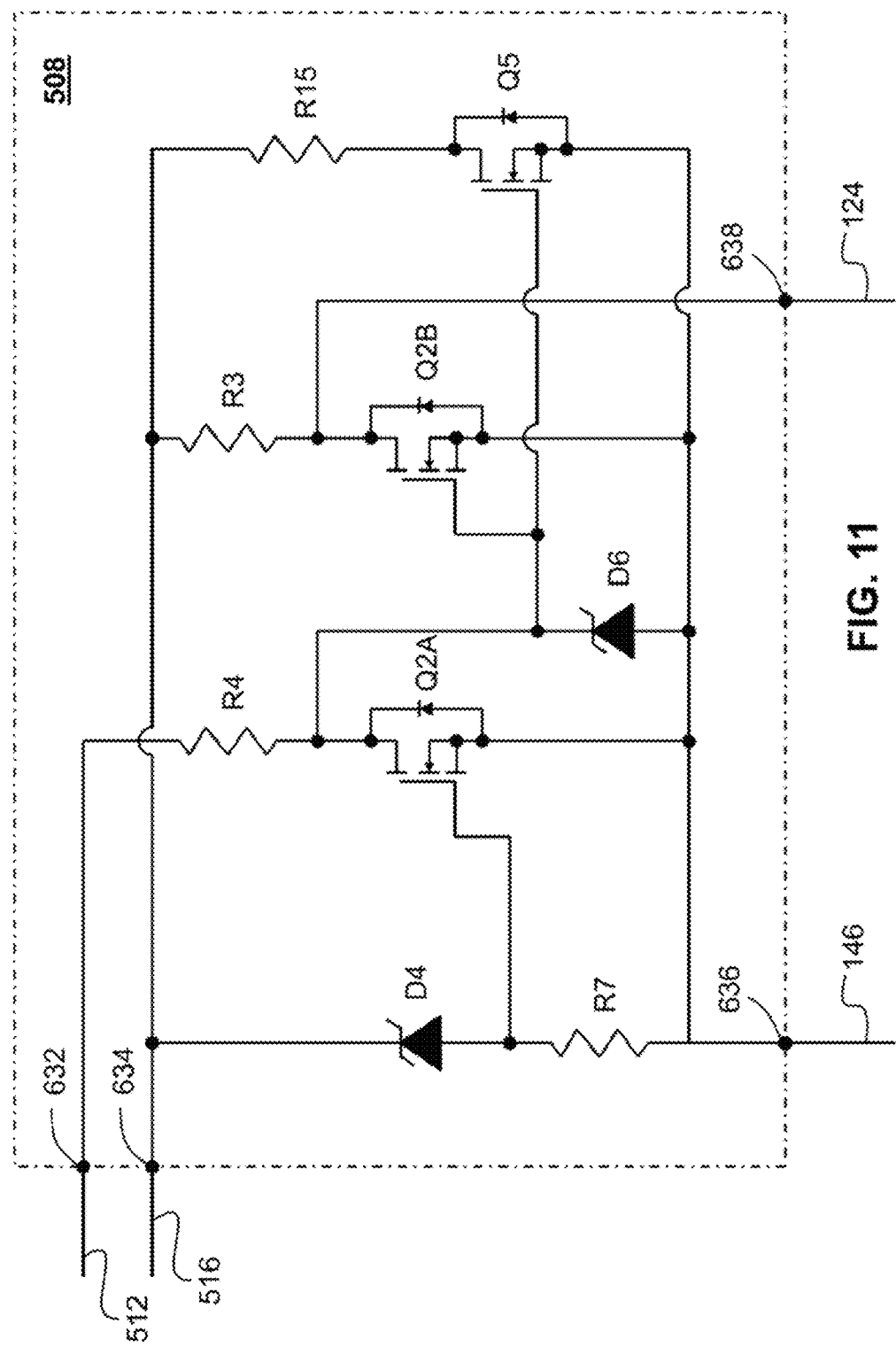
FIG. 11 depicts a circuit diagram of an under-voltage protection unit, according to an embodiment.

FIG. 11 depicts a circuit diagram of the under-voltage protection unit 508, according to an embodiment. The under-voltage protection unit 508 is arranged to monitor the voltage level of the capacitor C1 in the power supply and storage unit 502. If the voltage of C1 falls below a certain level, it can potentially damage the IGBT switch Q1. If an under-voltage condition at C1 is detected by under-voltage protection unit 508, it disables the brake drive signal.

According to an embodiment, as shown in this figure, with continued reference to FIG. 7, under-voltage protection unit 508 includes two terminals 632 and 634 coupled respectively to line 512 from the power supply and storage unit 502 and line 516 from the gate drive unit 506. The under-voltage protection unit 508 also includes a Gnd terminal 636 coupled to line 146, which is in turn coupled to node 136 of the armature 105, and an output terminal 638, which is coupled via line 124 to the gate of Q1. Arranged between terminals 634 and 636 is a zener diode D4. If the voltage at terminal 634 (i.e., capacitor C1 voltage) falls below a certain threshold, e.g., 15V, zener diode D4, together with resistors R7 and R4 disable switch Q2A. Switch Q2A in turn controls the gate of Q2B to short terminal 638 to the Gnd terminal 636. Accordingly, if the voltage of capacitor C1 is at its normal operation range, line 124 is driven by the brake drive signal from line 156 to activate Q1. If the voltage of capacitor C1 falls below the threshold, this circuit grounds the brake drive signal of the gate of Q1 at line 124 to shut off Q1, thus stopping the braking operation.

An aspect of the invention is discussed herein. As discussed above, in an embodiment, the controller 120 typically initiates braking of the motor 28 and the braking continues for a predetermined amount of time, e.g., 2-5 seconds, until the capacitor C1 is fully discharged. A conflict occurs when a user action inadvertently opens the power switch (for example, the user's finger slips of the trigger switch). If the user attempts to use the tool again while the tool is in brake mode, it is inconvenient to the user to have to wait for the braking mode to complete, which as discussed above may take 2-5 seconds. Thus, in an embodiment, a mechanism is provided to stop the braking of the motor 28 if the power switch 106 becomes closed during the brake mode.

During the normal operation of the circuit shown in FIGS. 3-7, the controller 120 may sense whether the power switch 106 is open or close by sensing the voltage across the triac 110. Lack of voltage across the triac 110 is indicative of the power switch 106 being open. During the brake mode, however, the voltage across the triac 110 is no longer indicative of the state of the power switch 106. Thus, a different mechanism has to be utilized.

In one embodiment, the controller 120 may sense the state of the power switch 106 either directly or through an auxiliary sensor. In another embodiment, as depicted in FIGS. 7 and 12, a power switch on/off sensor 510 may be utilizes, according to an embodiment of the invention.

Figure 12:
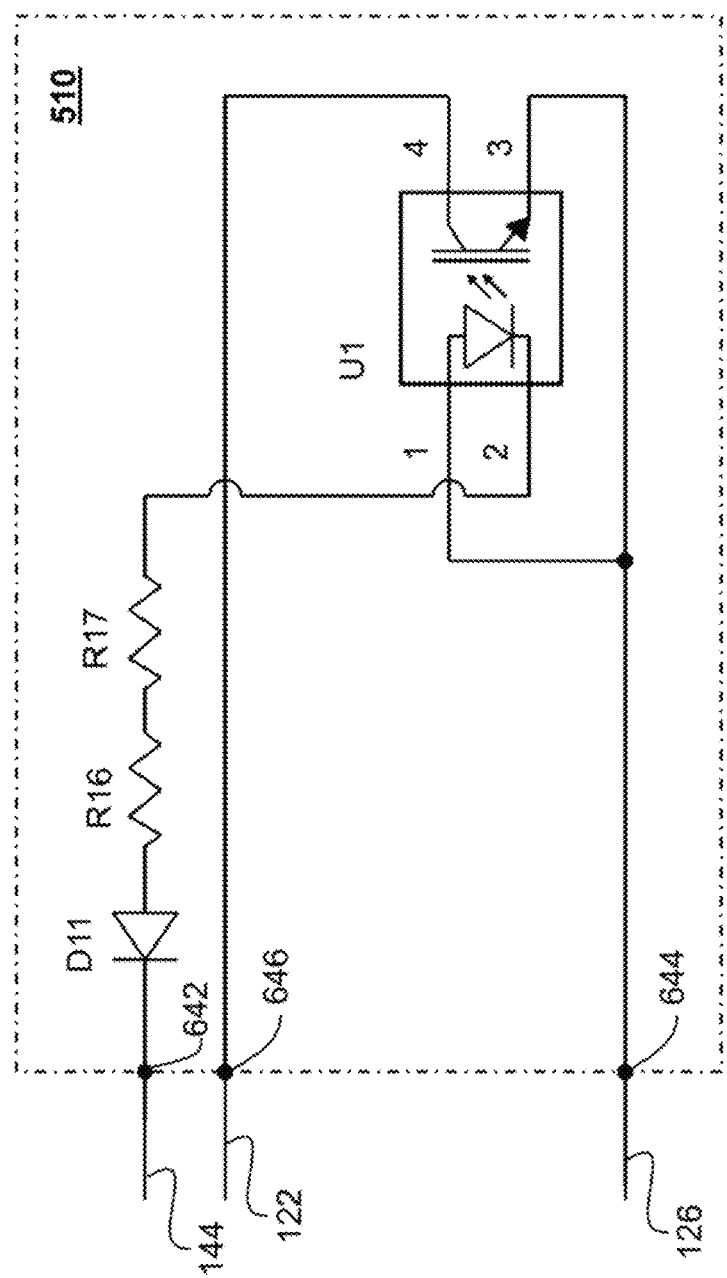
FIG. 12 depicts a circuit diagram of a power switch on/off sensor, according to an embodiment.

FIG. 12 depicts a circuit diagram of the power switch on/off sensor 510, according to an embodiment. In an embodiment, the on/off sensor 510 includes a first terminal 642 coupled via line 144 to node 134 between the armature 105 and the first field winding 102*a*. In series with terminal 642 are a diode D11, resisters R16 and R17, and a photo-coupler U1. The other end of the photo-coupler is coupled via a ground terminal 644 to the AC Gnd terminal. When the power switch 106 is closed, a current path is created though the photo-coupler U1, resisters R16 and R17, the diode D11, field winding 102*a*, and the power switch 106. This current turns on the photo-coupler U1, which in turn grounds the brake control signal 122 (coupled to terminal 646). Grounding the brake control signal 122 disables the gate driver 210 circuit. Furthermore, in an embodiment, the controller 120 is configured to sense the grounding of the brake control signal 122 and resume normal operation.

Figure 13:
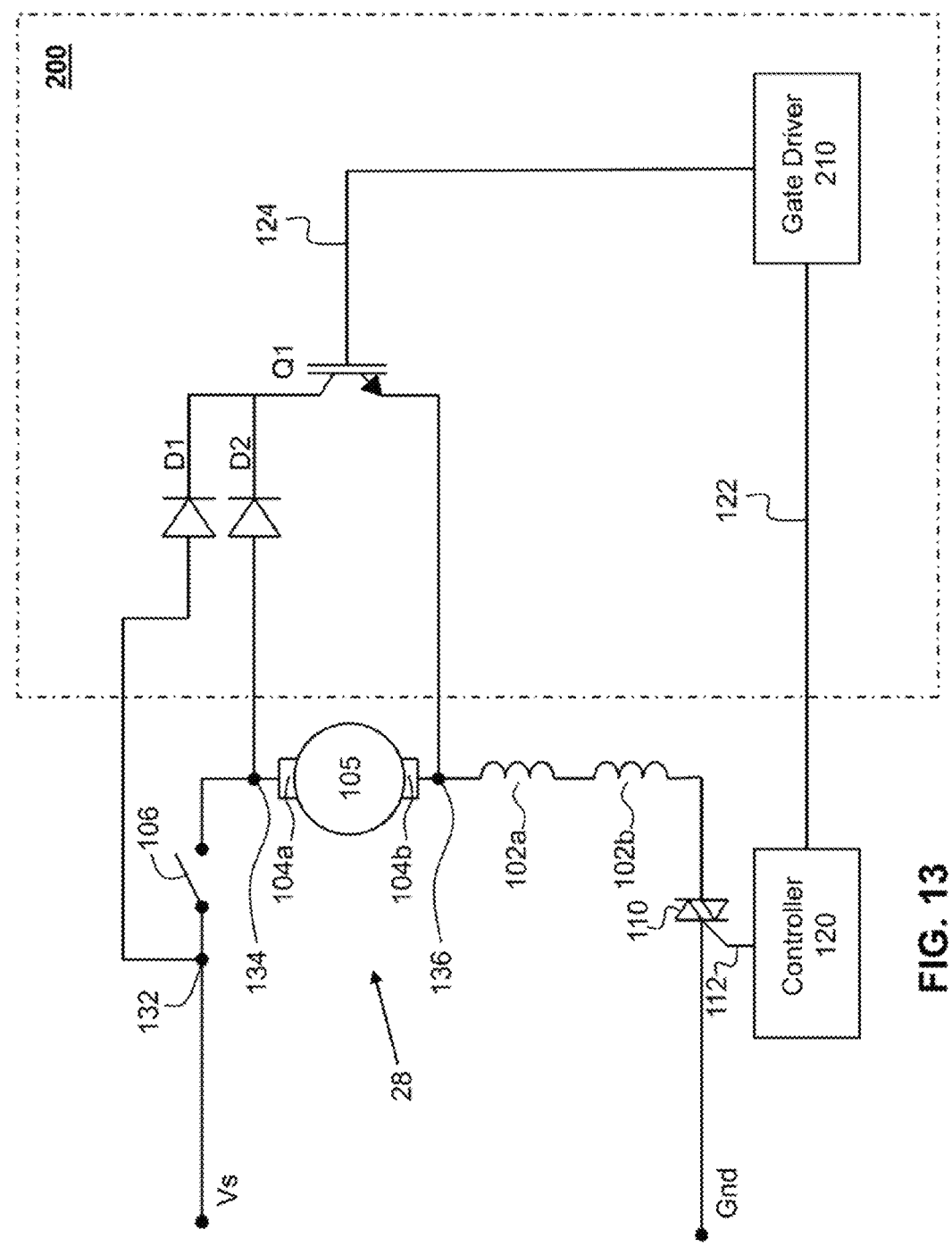
FIG. 13 depicts a modified version of block circuit diagram of FIG. 3, where both field windings are arranged on side of the armature, according to an embodiment.

FIG. 13 depicts a modified version of block circuit diagram of FIG. 3, where both field windings 102*a* and 102*b* are arranged on side of the armature 105 between the armature 105 and the power supply, e.g., between the GND node of the AC power source and the armature 105. In other words, none of the field windings 102*a* and 102*b* are arranged between the armature 105 and the power switch 106. In this manner, both field windings 102*a* and 102*b* are used to apply braking force on the motor. As previously discussed, this arrangement may provide the controller 120 with a smaller time frame to fire the triac 110 in order to obtain a smooth braking operation. However, it was found by the inventors that this effect may be offset by the combined mutual inductance of field windings 102*a* and 102*b*.

Figure 14:
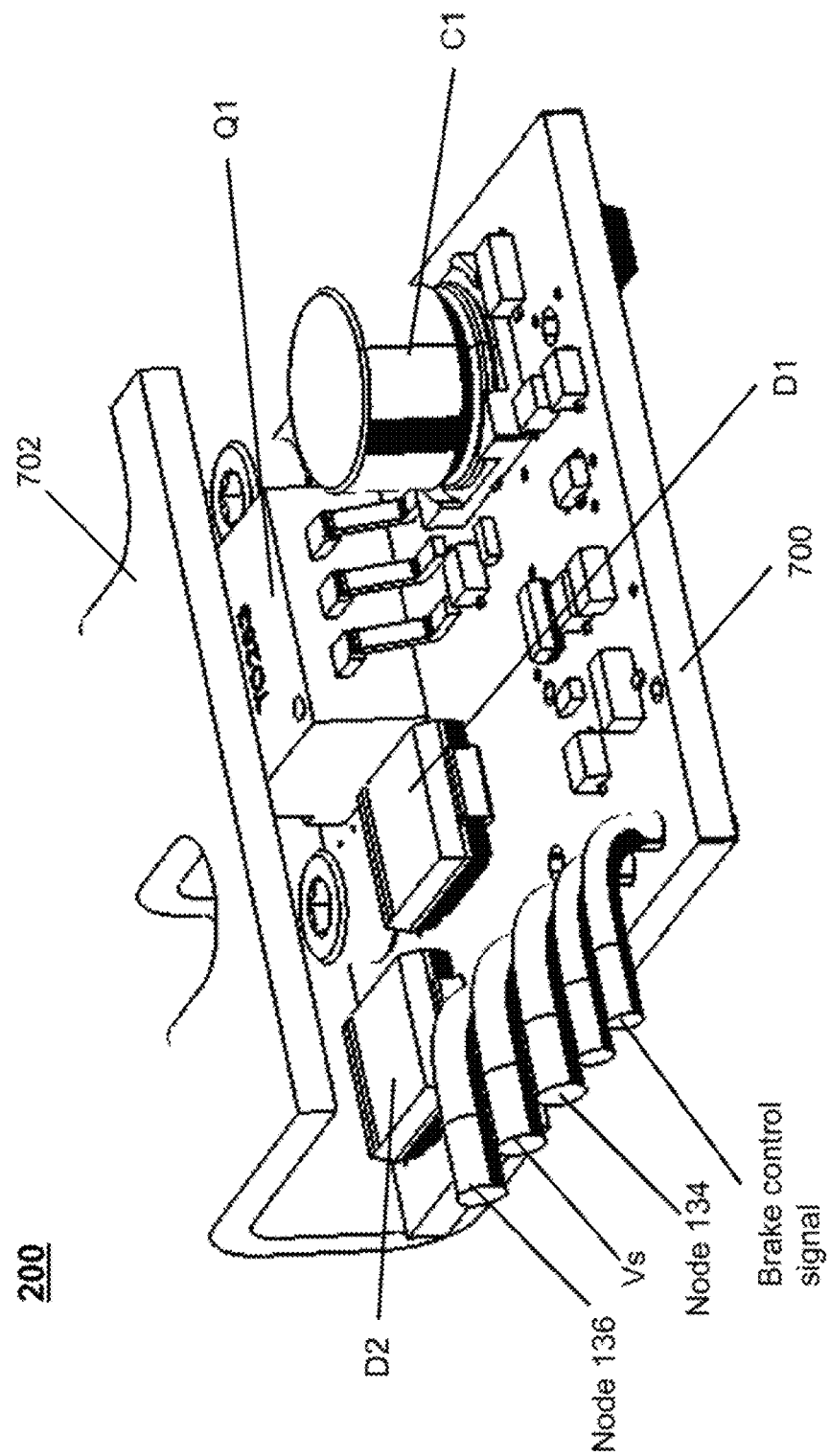
FIG. 14 depicts a perspective view of a brake module, according to an embodiment.

FIG. 14 depicts a perspective view of the brake module 200, according to an embodiment. As shown herein, the brake module 200 includes a circuit board 700 on which the diodes D1 and D2, switch Q1, and capacitor C1 are mounted. The brake module 200 also includes a heat sink 702 extending from the circuit board 700 and folded over o the aforementioned components for effective heat transfer. The folded portion of the heat sink 702 particularly covers the switch Q1, which is an IGBT in an exemplary embodiment. In an exemplary embodiment, the brake module 200 may be placed in a mold designed to overmold the circuit board 700 but not the heat sink 702.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

What is claimed is:

1. A power system comprising:
an electric universal motor including an armature rotatably coupled to an armature shaft and a commutator disposed on an armature shaft, a pair of brushes engaging the commutator, and a field having at least two field windings electrically coupled in series with the pair of brushes;
a power line having two terminals arranged to provide alternating-current (AC) power from a power supply;
a power switch provided in series with the field windings on a power line to provide AC power from the terminals to the motor when the power switch is closed;
an electronic brake module configured to generate a braking force to stop the motor when the switch is opened, the electronic brake module comprising: a solid-state semiconductor switch arranged across the motor armature and the pair of brushes, a first diode arranged between a first node of the power line and the semiconductor switch, and a second diode arranged between a second node of the power line and the semiconductor switch, wherein the first node is arranged between one of the terminals and the power switch, and the second node is arranged between the power switch and the armature; and
a controller configured to initiate a braking mode of operation to close the semiconductor switch when the power switch is opened,
wherein, in the braking mode of operation, current from the AC power source flows via a first current path through the first diode, the semiconductor switch, and at least one of the field windings, and current associated with the motor armature voltage flows via a second current path through the second diode and the semiconductor switch.

2. The power system of claim 1, wherein the controller is configured open the semiconductor switch when the power switch is closed to initiate a normal mode of operation.

3. The power system of claim 1, wherein one of the field windings is arranged between the armature and the power switch such that, in the braking mode of operation, current from the AC power source flows through the other field winding.

4. The power system of claim 1, wherein neither of the field windings is arranged between the armature and the power switch such that, in the braking mode of operation, current from the AC power source flow through the at least two field windings.

5. The power system of claim 1, wherein the controller configured to monitor voltage across the power switch to determine if the power switch is open or close.

6. The power system of claim 1, further comprising a phase-controlled switch disposed in series with the field windings on the power line to control the supply of AC power from the terminals to the motor.

7. The power system of claim 6, wherein, the controller is configured to control a phase of the phase-controlled switch according to a desired speed level of the motor in a normal mode of operation.

8. The power system of claim 6, wherein the controller is configured to monitor voltage across the controllable switch to determine if the power switch is open or closed.

9. The power system of claim 6, wherein the controller is configured to control a phase of the phase-controlled switch to optimize at least one of a baking time or braking torque associated with the motor in the braking mode of operation.

10. The power system of claim 9, wherein the controller is configured to control a phase of the phase-controlled switch to provide a conduction angle of forty degrees or lower.

11. The power system of claim 9, wherein the controller is configured to control the phase of the phase-controlled switch at a first conduction band within a first braking cycle and at a second conduction band different from the first conduction band within a second braking cycle.

12. The power system of claim 9, wherein the controller is configured to introduce a delay period between the power switch being opened and the semiconductor switch getting closed.

13. The power system of claim 1, wherein the electronic brake module comprises a gate driver configured to drive a gate of the semiconductor switch to close the semiconductor switch in the braking mode of operation based on a control signal from the controller.

14. The power system of claim 1, wherein the power system comprises a power tool.

15. The power system of claim 14, wherein the power tool comprises a grinder.

16. A power system comprising:
an electric universal motor including an armature rotatably coupled to an armature shaft and a commutator disposed on an armature shaft, a pair of brushes engaging the commutator, and a field having at least two field windings electrically coupled in series with the pair of brushes;
a power line having two terminals arranged to provide alternating-current (AC) power from a power supply;
a power switch provided in series with the field windings on a power line to provide AC power from the terminals to the motor when the power switch is closed;
an electronic brake module configured to generate a braking force to stop the motor when the switch is opened, the electronic brake module comprising: a solid-state semiconductor switch arranged across the motor armature and the pair of brushes, a first diode arranged between a first node of the power line and the semiconductor switch, and a second diode arranged between a second node of the power line and the semiconductor switch, wherein the first node is arranged between one of the terminals and the power switch, and the second node is arranged between the power switch and the armature;

a phase-controlled switch disposed in series with the field windings on the power line to control the supply of AC power from the terminals to the motor; and a controller configured to initiate a braking mode of operation to close the semiconductor switch when the power switch is opened, wherein the controller is configured to control a phase of the phase-controlled switch to optimize at least one of a baking time or braking torque associated with the motor in the braking mode of operation, the controller controlling the phase of the phase-controlled switch at a first conduction band within a first braking cycle and at a second conduction band different from the first conduction band within a second braking cycle.

17. The power system of claim 16, wherein the controller is configured open the semiconductor switch when the power switch is closed to initiate a normal mode of operation.

18. The power system of claim 16, wherein, in the braking mode of operation, current from the AC power source flows via a first current path through the first diode, the semiconductor switch, and at least one of the field windings.

19. The power system of claim 18, wherein, in the braking mode of operation, current associated with the motor armature voltage flows via a second current path through the second diode and the semiconductor switch.

20. The power system of claim 18, wherein one of the field windings is arranged between the armature and the power switch such that, in the braking mode of operation, current from the AC power source flows through the other field winding.

21. The power system of claim 18, wherein neither of the field windings is arranged between the armature and the power switch such that, in the braking mode of operation, current from the AC power source flow through the at least two field windings.

22. The power system of claim 16, wherein the controller is configured to control a phase of the phase-controlled switch according to a desired speed level of the motor in a normal mode of operation.

23. The power system of claim 16, wherein the controller is configured to control a phase of the phase-controlled switch to provide a conduction angle of forty degrees or lower.

24. The power system of claim 16, wherein the controller is configured to introduce a delay period between the power switch being opened and the semiconductor switch getting closed.

25. The power system of claim 16, wherein the power system comprises a power tool.

26. The power system of claim 25, wherein the power tool comprises a grinder.

27. A power system comprising:

an electric universal motor including an armature rotatably coupled to an armature shaft and a commutator disposed on an armature shaft, a pair of brushes engaging the commutator, and a field having at least two field windings electrically coupled in series with the pair of brushes;

a power line having two terminals arranged to provide alternating-current (AC) power from a power supply;

a power switch provided in series with the field windings on a power line to provide AC power from the terminals to the motor when the power switch is closed;

an electronic brake module configured to generate a braking force to stop the motor when the switch is opened, the electronic brake module comprising: a solid-state semiconductor switch arranged across the motor armature and the pair of brushes, a first diode arranged between a first node of the power line and the semiconductor switch, and a second diode arranged between a second node of the power line and the semiconductor switch, wherein the first node is arranged between one of the terminals and the power switch, and the second node is arranged between the power switch and the armature;

a phase-controlled switch disposed in series with the field windings on the power line to control the supply of AC power from the terminals to the motor; and a controller configured to initiate a braking mode of operation to monitor voltage across the controllable switch to determine if the power switch is open or closed and close the semiconductor switch when the power switch is opened.

28. The power system of claim 27, wherein the power system comprises a power tool.

* * * * *